June 20, 1944.                D. INGALLS                2,351,858

SECURING CLAMP

Filed March 6, 1941

David Ingalls INVENTOR.

BY Thomas Howe
ATTORNEY

Patented June 20, 1944

2,351,858

UNITED STATES PATENT OFFICE 2,351,858

SECURING CLAMP

David Ingalls, Westfield, N. J., assignor to Titeflex, Inc., a corporation of New Jersey Application March 6, 1941, Serial No. 382,001

5 Claims. (Cl. 24—19)

This invention relates to means for securely clamping a body such as a tube or rod, to a support.

While the invention may have any application in which it may be useful, it is especially intended to secure to internal combustion engines, particularly those on aeroplanes, the radio shielding conduit for the ignition wires of the engine. Such conduit usually consists of a corrugated metal tube surrounded by a braided covering of metal strips as shown for instance in the patent to L. H. Brinkman No. 1,340,818. Where such conduit is attempted to be secured by a clamp comprising an encircling band of flat, smooth strip having ears at its ends through which a bolt passes to draw the encircling band tightly about the conduit, and to secure it to a support, a number of objections and inefficiencies arise. There is nothing to prevent the conduit from sliding endwise through the clamp except the friction between the clamp and conduit. This is insecure at best, and particularly with conduits of small diameter, so that the conduit is liable to slide back and forth in the clamp, especially because of the vibrations of the engine. This sliding of the conduit in the clamp is liable to cause looseness of and injury to the parts, and also the conduit may become misplaced. If attempt is made to prevent sliding of the conduit in the clamp by drawing the clamp more tightly about the conduit to cause it to more tightly grip the same, injury to the conduit may result.

It is one of the objects of the present invention to provide a clamp which will more securely hold the conduit or like structure so that the disadvantages above referred to may be avoided. This is done by providing a clamp of which the part encircling the secured body has inwardly extending projections which engage with the secured body to reliably hold it against sliding in the clamp. When the clamp is of relatively thin sheet metal, such projections may be formed by a "prick punch" which, when applied to the outside of the clamp and struck with a hammer or the like, drives the metal inwardly, forming the projections. This operation also forms corresponding depressions on the outside of the clamp. In the case of the conduit having a braided covering as above referred to, the projections may extend into the interstices of the braid so that the clamp is effectually interlocked with the conduit.

Where the clamp is to be secured to a relatively thin support, such support may be entered, by a careless or unskilled person, between the ears on the clamp when it will be impossible to draw the clamp tightly about the secured body and the connection will be loose and insecure.

It is another object of the invention to provide means for preventing installation of the clamp with the support between its ears as just referred to.

A further object of the invention is to provide a clamp which shall act as a lock with relation to the nut of the securing bolt.

A further object of the invention is to provide improved construction of the supporting means for the clamp.

Other and ancillary objects of the invention will appear hereinafter.

In the accompanying drawing which illustrates the invention—

Figure 5:
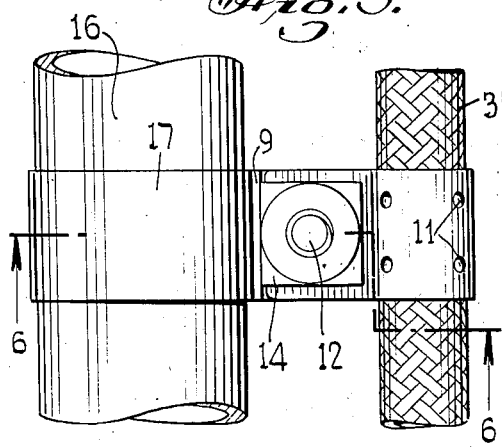
Fig. 5 is a side elevation of a structure similar to Fig. 1 but with a modified construction of support to which the clamp is secured.

Referring to the drawing, and first to Figs. 1 to 4 inclusive, 1 is a supporting bar which may be a brace bar between the cylinders of a radial engine, such as used on aeroplanes, and this bar may be tubular as shown or solid. This bar 1 has an integrally formed thin projecting lug 2 to which a radio shielding conduit 3 for an ignition wire of the engine is secured. This conduit may be a metal tube of the construction as shown in Fig. 5 of the patent to L. H. Brinkman No. 1,340,818, patented May 18, 1920, such conduit comprising a corrugated metal tube surrounded by a covering of braided metal strips.

The conduit 3 is secured to the support by means of a clamp formed of thin sheet metal and having the encircling portion 4 which surrounds the conduit 3, such encircling portion having ears 5 and 6 at its ends. The ears are provided with holes 7 and 8 for the passage of a securing bolt, and the ear 5 has its end 9 bent at an angle toward the other ear 6 and overlapping and extending beyond the same.

The encircling portion 4 of the clamp has the projections 10 extending inwardly from its inner surface. Such projections may readily be formed, the metal being thin, by applying prick-punch to the outside of the encircling portion and striking it with a hammer when the metal will be forced inwardly to form a projection 10, and of course a depression 11 upon the outside of the encircling portion will be simultaneously formed.

The conduit 3 having been passed through the clamp, the bolt 12 will be passed through the hole 13 in the lug 2 and through the holes 7 and 8 in the clamp ears 5 and 6.

A nut 14 having a flat side is then applied to the bolt which can be screwed up by a screwdriver inserted in the slot 15, the nut being prevented from turning by having its flat side against the bent-over portion 9 of the clamp ear. It will be seen that this apparatus thus has a nut-lock to prevent the nut from unscrewing.

It will be seen that the clamp ears 5 and 6, when in secured position, lie flat against each other and flat against one side of the lug 2, the ears both being on the same side of the lug. With this assembly and the tightening up of the bolt, the portion of the clamp encircling the conduit will be drawn tightly against the conduit so as to securely grip the same, and the inwardly extending projections will even penetrate in between the strands of the external braid so as to interlock the parts to prevent longitudinal sliding of the conduit within the clamp, and this is true regardless of the size of the conduit, so that all sizes of conduit are securely held.

The clamp being designed to provide such cooperation with the conduit when so assembled, it will now be seen that if means were not provided to prevent it, a careless or ignorant operator might assemble the parts with the lug 2 between the ears. With such assembly, the tightening of the nut would not cause proper gripping of the conduit by the clamp. Such mis-assembly, however, is prevented by the bent-over ear end 9 which provides an obstruction to the entry of the lug 2 between the clamp ears and enforces the placing of both clamp ears on the same side of the supporting lug 2 when the tightening of the bolt will securely clamp all of the parts together.

Figure 2:
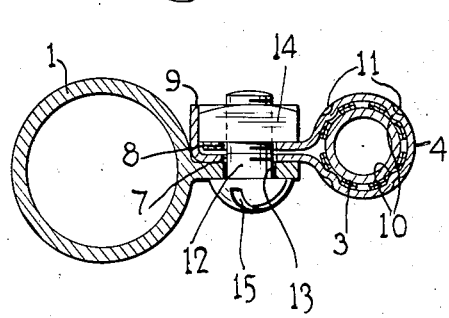
Fig. 2 is a section on the line 2—2 of Fig. 1.
Figure 1:
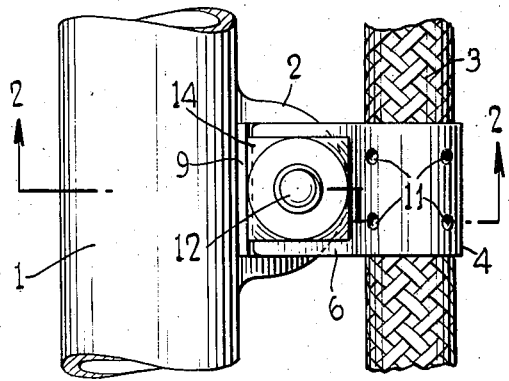
Fig. 1 is a side elevation of a structure embodying the invention including, a support, a conduit and clamp securing the conduit to the support, the last being broken away.
Figure 3:
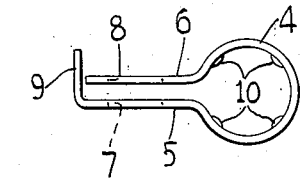
Fig. 3 is a side elevation of the clamp alone.
Figure 4:
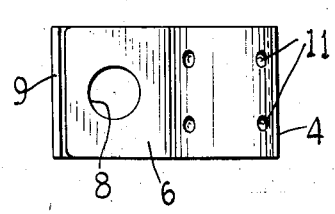
Fig. 4 is a top plan of the clamp shown in Fig. 3.
Figure 6:
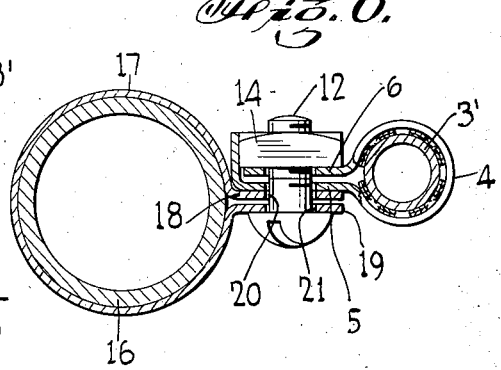
Fig. 6 is a section on the line 6—6 of Fig. 5.

Referring now to Figs. 5 and 6 of the drawing, there is therein shown a supporting bar 16 which is of smooth, cylindrical contour and without an attaching lug as in the structure of Fig. 1. To provide means for securing a conduit-attaching clamp to such bar, a clamp having the encircling portion 17 with ears 18 and 19 at its ends is placed about the bar 16, the ears having holes 20 and 21 for an attaching bolt. These ears together constitute in effect an attaching lug to which the conduit 3' is secured by a second clamp in all respects the same as the clamp employed for securing the conduit 3 to the lug 2 in the structure of Figs. 1 to 4 inclusive. With the conduit-securing clamp placed about the conduit and ears of that clamp laid along one side of the lug formed by the two ears 18 and 20, and with the securing bolt inserted through the holes in all four clamp ears, when the bolt is tightened to draw the ears tightly together, the clamp about the conduit will tightly grip the conduit while the supporting bar 16 will be tightly gripped by the clamp encircling it and the parts will be firmly and securely held together against relative movement.

While the invention has been illustrated in what are considered its best applications, it may have other embodiments without departing from its spirit and is not, therefore, limited to the structures shown in the drawing.

What I claim is:

1. A securing clamp comprising an encircling portion having ears at its ends and inwardly extending projections from the inner surface of said portion, one of said ears having a portion bent at an angle and overlapping the other of said ears when in normal unsecured position, said ears having holes, and a bolt extending through said holes, said ears being movable toward and away from each other and drawn toward each other by said bolt.

2. A securing clamp comprising an encircling portion having ears at its ends, one of said ears having a portion bent at an angle and toward the other of said ears and overlapping the said other of said ears when the clamp is in normal unsecured position, said ears having holes, and a bolt extending through said holes, said ears being movable toward and away from each other and drawn toward each other by said bolt.

3. A securing clamp comprising an encircling portion having ears at its ends and inwardly extending projections from the inner surface of said portion, the end of one of said ears being bent at an angle and overlapping and extending beyond the other of said ears when the clamp is in secured position, said ears having holes for a securing bolt, a bolt passing through said holes, a nut for said bolt having a plane side engaging with the said bent-over overlapping end of one of the ears, to prevent the nut from turning.

4. The combination with a supporting bar having a lug thereon, of a securing clamp for securing a body to said supporting bar, said clamp comprising an encircling portion having ears at its ends, the end of one of said ears being bent toward and overlapping the other of said ears when the clamp is in securing position, a bolt passing through said lug and said ears to secure said clamp to said supporting bar and to tighten said encircling portion to grip the body to be supported, said ears being both located at one side of said lug.

5. The combination with a supporting bar, of a clamp having a portion encircling the same and ears at the ends of said portion, a second clamp comprising an encircling portion having ears at its ends, the end of one of the ears of the said second clamp being bent toward and overlapping the other ear of said second clamp when in securing position, and a bolt passing through the ears of both of said clamps, the ears of said second clamp being both at the outer side of one of the ears of the first mentioned clamp.

DAVID INGALLS.